(12) United States Patent
von Bose et al.

(10) Patent No.: US 10,706,383 B2
(45) Date of Patent: Jul. 7, 2020

(54) METHOD AND APPARATUS PERTAINING TO MODULE-BASED SCANNING OF RFID TAGS

(75) Inventors: Samuel John von Bose, Springdale, AR (US); Wendell Lachica Valdez, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 1035 days.

(21) Appl. No.: 12/844,483

(22) Filed: Jul. 27, 2010

(65) Prior Publication Data

US 2012/0013440 A1   Jan. 19, 2012

Related U.S. Application Data

(60) Provisional application No. 61/365,294, filed on Jul. 16, 2010.

(51) Int. Cl.
*G06F 7/04* (2006.01)
*G06Q 10/08* (2012.01)
(Continued)

(52) U.S. Cl.
CPC ..... *G06Q 10/0833* (2013.01); *G06K 17/0029* (2013.01)

(58) Field of Classification Search
CPC ............. G06Q 10/0833; G06Q 10/087; G06K 17/0029; G06K 2017/0051;
(Continued)

(56) References Cited

U.S. PATENT DOCUMENTS 4,688,026 A * 8/1987 Scribner et al. .............. 235/385
5,850,187 A   12/1998 Carrender
(Continued)

FOREIGN PATENT DOCUMENTS

CN       1558358     12/2004
CN      101322141     2/2012
(Continued)

OTHER PUBLICATIONS

"EPC™ Radio-Frequency Identity Protocols Class-1 Generation-2 UHF RFID Protocol for Communications at 860 MHz-960 MHz Version 1.0.9;" Specification for RFID Air Interface by EPCglobal Inc.; 94 pages, Jan. 2005.
(Continued)

*Primary Examiner* — Edwin C Holloway, III
(74) *Attorney, Agent, or Firm* — Fitch, Even, Tabin & Flannery LLP

(57) ABSTRACT

These teachings comprise accessing an identifier as corresponds to a given module of RFID-tagged items and then using that identifier to filter the RFID tag readings. By one approach, one can obtain this identifier for the module by reading an optical code as corresponds to the given module of items. By another approach, one can obtain this identifier by reading an RFID tag that specifically correlates to the given module of items. By yet another approach, one can obtain this identifier by receiving the identifier as entered by an end user who is participating in the RFID tag reading process. If desired, this identifier can serve to recall corresponding information that can serve, directly or indirectly, as filter criterion to use when processing the RFID tag responses.

3 Claims, 2 Drawing Sheets

(51) Int. Cl.
*G06K 17/00* (2006.01)
*H04Q 5/22* (2006.01)

(58) Field of Classification Search
CPC .......... G06K 17/0022; G06K 17/0025; G06K 19/06009; G06K 19/06018; G06K 19/06028; G06K 19/06037; G06K 19/0723
USPC ................ 340/5.85, 5.92, 10.1, 10.42, 572.1
See application file for complete search history.

(56) References Cited

U.S. PATENT DOCUMENTS

| | | | |
|---|---|---|---|
| 5,886,634 A * | 3/1999 | Muhme | ............ 340/572.1 |
| 6,026,378 A * | 2/2000 | Onozaki | ................ 705/28 |
| 6,078,251 A | 6/2000 | Landt | |
| 6,354,493 B1 | 3/2002 | Mon | |
| 6,420,961 B1 | 7/2002 | Bates | |
| 6,631,271 B1 * | 10/2003 | Logan | ............... G06F 3/002 455/456.1 |
| 6,677,852 B1 * | 1/2004 | Landt | ................ 340/10.1 |
| 7,187,288 B2 | 3/2007 | Mendolia et al. | |
| 7,205,896 B2 | 4/2007 | Wu et al. | |
| 7,298,243 B2 * | 11/2007 | Juels et al. | ............... 340/10.4 |
| 7,528,726 B2 | 5/2009 | Lee et al. | |
| 7,598,875 B2 | 10/2009 | Noguchi | |
| 2001/0008390 A1 | 7/2001 | Berquist et al. | |
| 2003/0216969 A1 * | 11/2003 | Bauer | ............... G06K 7/0008 705/22 |
| 2005/0093698 A1 | 5/2005 | Sakamoto | |
| 2006/0049249 A1 | 3/2006 | Sullivan | |
| 2006/0208859 A1 * | 9/2006 | Hougen | ............... G06K 7/0008 340/10.1 |
| 2007/0057800 A1 | 3/2007 | Coughlin | |
| 2008/0231426 A1 | 9/2008 | Kamel | |
| 2008/0249899 A1 | 10/2008 | Nasser | |
| 2010/0079245 A1 | 4/2010 | Perng et al. | |
| 2011/0025462 A1 | 2/2011 | Stern | |
| 2012/0086554 A1 | 4/2012 | Wilkinson | |
| 2012/0161939 A1 | 6/2012 | Posamentier | |
| 2012/0223817 A1 | 9/2012 | Hansen | |
| 2012/0274449 A1 | 11/2012 | Wilkinson | |

FOREIGN PATENT DOCUMENTS

| | | |
|---|---|---|
| JP | 2006-127034 | 5/2006 |
| KR | 1020050028472 | 3/2005 |
| KR | 10-0669222 | 1/2007 |
| KR | 10-2009-0019219 | 2/2009 |

OTHER PUBLICATIONS

PCT; App. No. PCT/US2011/044276; International Search Report dated Feb. 21, 2012.
PCT; App. No. PCT/US2011/044276; Written Opinion dated Feb. 21, 2012.
PCT; App. No. PCT/US2011/044276; International Preliminary Report on Patentability dated Jan. 31, 2013.
Intellectual Property India; App. No. 1125/CHEN/2013; Examination Report dated Feb. 2, 2019.

* cited by examiner

METHOD AND APPARATUS PERTAINING TO MODULE-BASED SCANNING OF RFID TAGS

RELATED APPLICATION(S)

This application claims the benefit of U.S. Provisional application No. 61/365,294, filed Jul. 16, 2010, which is incorporated by reference in its entirety herein.

This application is related to co-pending and co-owned U.S. patent application Ser. No. 12/844,499, entitled METHOD AND APPARATUS PERTAINING TO FACILITATING THE READING OF RFID TAGS and filed on even date herewith, which is incorporated by reference in its entirety herein.

TECHNICAL FIELD

This invention relates generally to the reading of Radio Frequency Identification (RFID) tags.

BACKGROUND

RFID tags are known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are self-powered (in whole or in part) while others are completely dependent upon an external power source to support their occasional functionality.

There are proposals to utilize RFID tags to individually identify individual items. The Electronic Product Code (EPC) as managed by EPCGlobal, Inc. represents one such effort in these regards. EPC-based RFID tags each have an utterly unique serial number to thereby uniquely identify each tag and, by association, each item associated on a one-for-one basis with such tags.

Being able to read and then uniquely identify each item within a manufacturing facility, a cargo container, a staging area, or in a retail display area offers any number of useful opportunities. Unfortunately, the very nature of RFID-based technology, coupled with a correspondingly potentially enormous number of individually-tagged items, also gives rise to a number of challenges as well. As one simple example in these regards, retailers often present their items as modularized offerings (using a support platform of choice, such as a shelf or set of shelves, a tabletop, a display rack, and so forth). In many application settings these modules are physically discrete displays of items that are offered for retail sale.

In such a case, it can be helpful to inventory such items on a module-by-module basis. Unfortunately, present RFID tag methodologies and approaches offer little to specifically support such an approach. This problem exists, at least in part, because there is nothing inherent or intrinsic about the EPC coding scheme (or its functional counterparts) and/or its corresponding reading protocol that identifies, for example, a specific module to which a corresponding item belongs. Furthermore, such an arrangement would not necessarily be helpful in and of itself, as a given retailer can decide to modularize a given collection of items in ways that are unanticipated by such an a priori approach.

BRIEF DESCRIPTION OF THE DRAWINGS

The above needs are at least partially met through provision of the method and apparatus pertaining to module-based scanning of RFID tags described in the following detailed description, particularly when studied in conjunction with the drawings, wherein.

Figure 1:
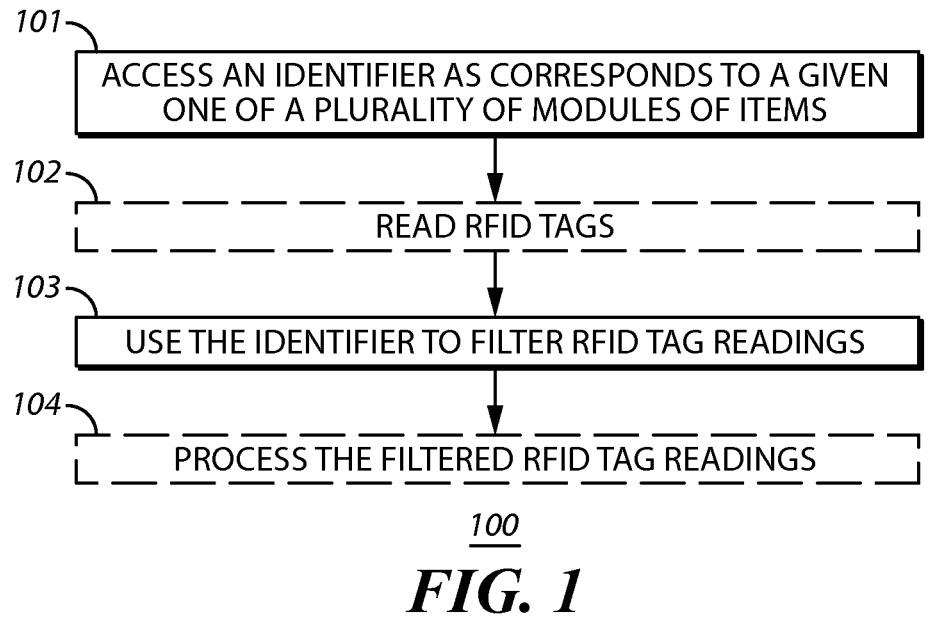
FIG. 1 comprises a flow diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these various embodiments are suitable for use when reading radio frequency identification (RFID) tags as correspond to a plurality of items that are collected together as a module. By one approach, these teachings generally comprise accessing an identifier as corresponds to a given such module and then using that identifier to filter the RFID tag readings.

By one approach, one can obtain this identifier for the module by reading an optical code as corresponds to the given module of items. By another approach, one can obtain this identifier by reading an RFID tag that specifically correlates to the given module of items. By yet another approach, one can obtain this identifier by receiving the identifier as entered by an end user who is, for example, participating in the RFID tag reading process. These teachings will accommodate other approaches in these regards as desired.

By one approach, this identifier can serve to recall corresponding information that can serve, directly or indirectly, as filter criteria. For example, when a given identifier is associated with a given stock-keeping unit (SKU) number (or numbers), those SKU numbers can be used to eliminate RFID tag responses that present alternative SKU content. These teachings contemplate and will accommodate numerous other approaches in such regards. Accordingly, when looking for a first brand of jeans that are associated with a given module of items, RFID tags for a second brand of jeans (or indeed any other product) can be readily filtered out by this approach.

So configured, an associate with an RFID tag reader can make their way through a retail display area that includes a plurality of modules of items. Pursuant to these teachings this associate can read RFID tags on a module-by-module basis, notwithstanding that the relative proximity of neighboring modules may assure that RFID tags for items that are not a part of a present module of interest will respond to that RFID tag interrogation. This, in turn, can permit an RFID tag-based inventory process to proceed on a modularized basis that may accord well with the store's usual and ordinary inventory control processes. These teachings will also permit a logically-parsed inventory process to be carried out using RFID tag methodologies without also requiring the retail enterprise to utilize unique materials and/or display layouts to try and prevent RFID tag responses from tags that are not presently of interest.

It will be appreciated that these benefits are readily attained in a manner that leverages presently-available RFID tag technology and methodology. It will further be appreciated that these teachings are readily scaled and can be applied in conjunction with a wide variety of items, RFID tag technologies and form factors, and modular concepts, form factors, and sizes.

These and other benefits may become clearer upon making a thorough review and study of the following detailed description. Referring now to the drawings, and in particular to FIG. 1, an illustrative process 100 that is compatible with many of these teachings will now be presented. Generally speaking, this process 100 finds use with modules of items, where at least a plurality of the items each have an RFID tag. In many application settings of interest, this will comprise a plurality of such modules. There is no requirement that there be any particular number of modules, that the modules be identical (or different) to one another, that the modules contain identical (or different) items, or any like constraint.

Figure 2:
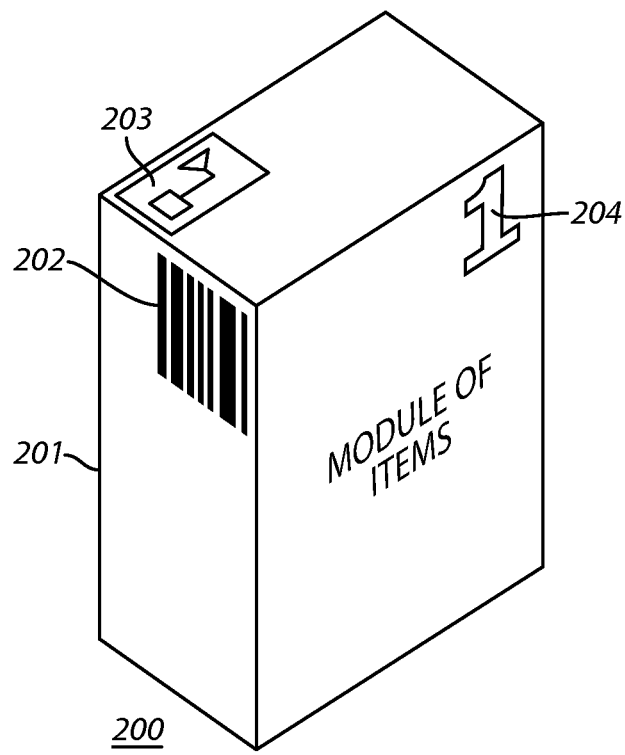
FIG. 2 comprises a perspective schematic view as configured in accordance with various embodiments of the invention.

At step 101 this process 100 provides for accessing an identifier as corresponds to a given one of the modules of items. There are numerous possibilities in these regards. Referring momentarily to FIG. 2, a schematically-represented module of items 200 having a corresponding form factor 201 (comprising at least a support platform such as a flat horizontal surface, a support rod or hook, or the like) can have an optical code 202 disposed thereon (either directly or indirectly) or nearby (such as on the floor immediately adjacent the module of items (200)). This optical code 202 can comprise, for example, one of many various kinds of so-called bar codes including any of a variety of one and two-dimensional codes as are known in the art. Numerous other possibilities are available in these regards, however, and may be utilized as well as desired.

By one approach this optical code 202 uniquely identifies this particular module of items 200 amongst other modules that are also present in the application setting (such as in the customer area of a retail enterprise, in a store room or stock room, in a distribution center warehouse, and so forth). By another approach, an optical code of interest can comprise a part of, or be otherwise attached to, a particular item that comprises one of the items of the module itself. This might comprise, by way of illustration, an optical bar code on a label on a particular product that is displayed in a particular shelf unit. This approach can be particularly useful when this item-oriented optical code is for an item that is likely only located with a particular module. In that case, reading the item's optical code can facilitate a process that then utilizes that optical code to correlate that particular item with that particular module of items. Once this particular module of items has been identified, the process can then proceed as described herein.

As another example in these regards, this identifier can be provided by reading an RFID tag 203 for the given module of items 200. This RFID tag 203 can be technologically identical or similar to the RFID tags used with the items themselves or can be different as desired. Similarly, this RFID tag 203 can employ a signaling scheme that is identical to that used by the items' RFID tags or different as appropriate. By one approach this RFID tag 203 serves to uniquely identify this particular module of items 200 as compared to other modules within the application setting.

And as yet another example in these regards, this identifier can be directly and physically entered by an end user. In this case, and by one approach, the module of items 200 can have a visually-evident identifier 204 (such as a number or other code of choice) that this end user can enter using, for example, a keypad, touchscreen, or other data-entry modality of choice. And again, by one approach, this visually-evident identifier 204 serves to uniquely identify this particular module of items 200 with respect to other modules within the application setting.

The foregoing examples are provided for the sake of example and are not intended to comprise an exhaustive listing of all possibilities in these regards. For example, each such module might have a low-power radio frequency transmitter that broadcasts a very-short-range beacon to uniquely identify each such module. Accordingly, it will be understood that these teachings are not limited to any particular approach in these regards.

Referring again to FIG. 1, at optional step 102 this process provides for reading RFID tags. This likely comprises reading at least some of the RFID tags as comprise the given module of items for which the aforementioned identifier was accessed. In many application settings, however, this will also comprise reading RFID tags for items that are not associated with that particular module of items.

Figure 3:
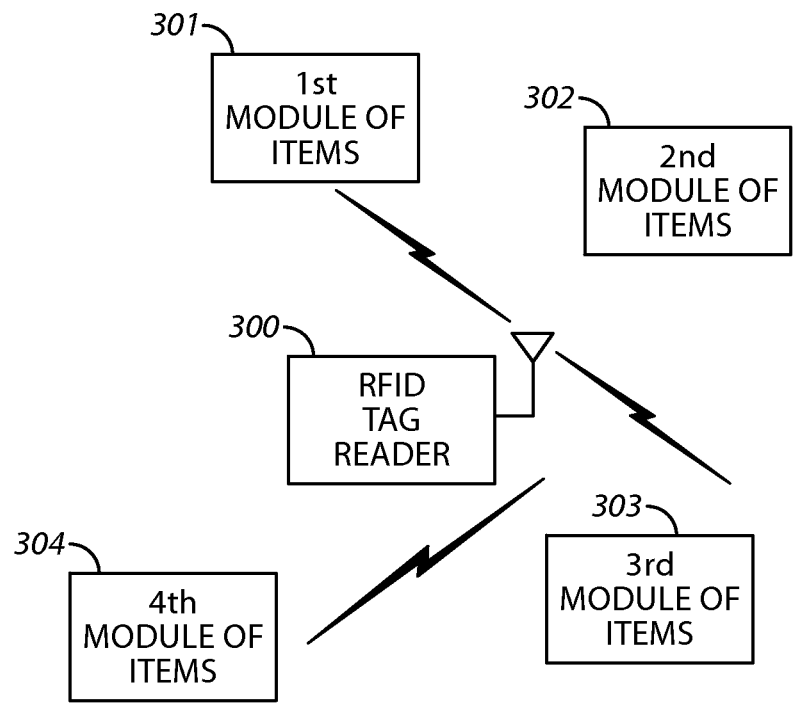
FIG. 3 comprises a block diagram view as configured in accordance with various embodiments of the invention.

For example, and referring momentarily to FIG. 3, when attempting to use an RFID tag reader 300 to intentionally read the RFID tags as correspond to items for a given module of items (which might be, by way of illustration, a first module of items 301 that comprises a particular display rack of clothes) the range of the RFID tag reader 300 may also prompt interrogation responses from RFID tags for items on nearby modules 302-304 (such as other adjacent display racks). Such a circumstance, of course, can be unwanted and/or confusing in context and comprises at least one issue addressed by these teachings.

Referring again to FIG. 1, at step 103 this process 100 then uses the aforementioned identifier (for the given module of items) to filter these RFID tag readings. By one approach this comprises using the module's identifier to access one or more corresponding items of information (for example, by accessing a look-up table or other store of data such as a database) that can be specifically applied as a filter criterion.

As a simple illustrative example in these regards, and without intending any corresponding limitations, presume that the accessed identifier for a particular module of items is "55" (in an application setting where, for the sake of example, there are one hundred individual and discrete modules of items that are individually identified by corresponding identifiers "1" through "100"). A look-up table can then reveal that three SKU numbers have previously been correlated with this particular module identifier. For the sake of example, it will be presumed here that these three SKU numbers are "123," "456," and "789."

To continue with this illustrative example, read RFID tags that do not correlate with one of these three SKU numbers can effectively be discarded. Therefore, and by way of example, five RFID tags that present the SKU number "123" will be retained (as these match the filter criteria in this example) while three RFID tags that present the SKU number "345" will be discarded, ignored, or the like as failing to meet the aforementioned filter criteria. Accordingly, at least some items physically associated with other modules of items and that respond to the aforementioned read step 102 will be filtered out of the read results and thereby assist with preserving the integrity of the modular-based read.

In some cases, as suggested above, such filtering can be based upon some portion of the corresponding electronic product code as serves to represent, for example, the supplier/manufacturer of interest or a general category as corresponds, for example, to a given SKU number. These teachings are highly leverageable, however, and will support other possibilities in these regards.

As one illustrative example in these regards, a given enterprise may themselves partition the serial number portion of electronic product code to accommodate a number of different suppliers who supply this given enterprise with a fungible commodity. To illustrate by way of a specific example, a given electronic product code may have a serial number field having 38 bits. The given enterprise could then reserve, say, the 8 most significant bits of this serial number to identify up to 256 different suppliers of a particular commodity. The remaining 30 bits could then be used by those suppliers when creating tags for their individual products without concern for whether two such suppliers happen to select and use the same number within these 30 bits.

As a very simple example in these regards, suppose that the enterprise has three suppliers (company A, company B, and company C) that each supply gallon-sized containers of milk to the enterprise for retail sale by the latter. Company A could be assigned 00000001 as their company identifier, company B could be assigned 00000010 as their company identifier, and company C could be assigned 00000011 as their company (these being intended for use as the most-significant bits of the serial number portion of their respective electronic product codes for their gallon-sized containers of milk). These companies could then use the remaining 30 bits as they wished as there could be no possibility that the final total 38-bit serial numbers would be the same because even if the serial numbers happened to match in the 30-bit portion of the total serial number, the 8 most-significant bits will, by design, be unique as described.

Such an approach avoids the need for central allocation of each and every serial number in order to ensure truly unique numbers and readily accommodates permitting a given top-level EPC user to uniquely identify fungible products at the level of the supplier. In such a case, the present teachings can utilize, for example, this supplier-identifying portion of a serial number as a filter criterion.

As another illustrative example in these regards, a given enterprise may adopt a particular approach to re-tagging items that can be similarly leveraged by these teachings. (An item can require re-tagging when the item arrives at the enterprise without a tag, or when the tag is lost or rendered inoperable prior to sale. Re-tagging can present challenges with respect to ensuring that serial numbers cannot be inadvertently duplicated when used in combination with a particular company name and product identifier.)

To illustrate, a given electronic product code, in addition to a large serial-number space, may provide an 8-bit field to identify a particular company and a 6-bit field to represent a product identifier. So, for example, the number 00000001 might identify company A and the number 000001 might identify a particular SKU number. These identifiers might be easily determined when a retailer discovers an untagged item but a quandary can nevertheless still exist regarding what serial number to use in conjunction with those identifiers when re-tagging the item in order to avoid creating a duplicate tag.

In some cases, the electronic product code protocol may permit variations to such a scheme by permitting the user to flexibly partition this company name/product identifier space (for example, by providing a partition value in an EPC header that indicates how many bits are allocated for the product identifier). In such a case, the re-tagging entity can set the partition value to "0" and hence allocate zero bits for the product identifier and all fourteen bits for the company name. The re-tagging entity can then set the "company" 14-bit value to match the concatenation of the actual company name and product identifier as corresponds to the re-tagged item. Using the example provided immediately above, when the company identifier is 00000001 and the product identifier is 000001, this would result in the 14-bit company identifier being 00000001000001.

The re-tagging entity can now allocate a serial number for the re-tagged item, knowing that duplication is avoided because this series of serial numbers, used in conjunction with this 14-bit "company" identifier, is fully under the control of the re-tagging entity. Accordingly, the re-tagging entity can consult its own records in these regards and select an available (i.e., previously unused) serial number to use with this particular "company" name.

When later reading such an RFID tag, the zero-value partition value can be noted and utilized to cause the reader (or some downstream processor of choice) to partition this 14-bit value into its constituent company name and product identifier values. In the example above, this will result in partitioning the 14-bit value 00000001000001 into the original company name 00000001 and the product identifier 000001. The reader can then make use of the read-tag information exactly the same as if it were an original tag.

Such an approach can be supplemented, if desired, to accommodate the needs of enterprises that comprise a plurality of facilities (such as a plurality of retail stores, distribution centers, and/or so-called buyer's clubs) where such re-tagging may occur. In such cases, one can also include the number that identifies the facility that is doing the re-tagging within a predetermined position within the serial number itself. For example, the last 4 digits of the serial number might be reserved and utilized for this purpose. As another approach to aid in avoiding duplicate RFID tags when re-tagging in such an application setting, one can increment each re-tagging serial number by some integer other than "1" (such as, for example, by "10,000"). Such an approach will help to ensure that when a product is re-tagged by a first facility and is then transferred to another facility, that there will be an even further reduced chance of a duplicate of that same product (as re-tagged by the receiving facility) being on hand.

In such a case, of course, the present teachings can be configured to provide for monitoring read-tag data to determine whether this partition value has been set to zero. When true, these teachings can then provide for extracting, for example, the product identifier as described above for use as a filter criterion.

By one approach the aforementioned information that correlates specific module identifiers with other information can be locally stored and available at the RFID tag reader itself. By another approach, such information can be remotely stored. In such a case, the RFID tag reader can be configured to access such information via an appropriate corresponding data information. Examples in these regards include any of a variety of wireless and non-wireless network interfaces. These architectural options are well known in the art and therefore further elaboration in these regards will not be provided here.

Similarly, the aforementioned filtering activity can be carried out at the RFID tag reader itself and/or can be carried out, in whole or in part, remotely from the RFID tag reader. Again, the use of local and/or remote processing capabilities comprises a generally well-understood area of endeavor. As these teachings are not particularly sensitive to any particular selections in these regards, no further description will be provided here.

Optional step 104 then provides for processing the filtered RFID tag readings. The specifics of this processing can vary greatly from one application setting to another depending, at least in part, upon the requirements and/or opportunities as tend to characterize the given application setting.

By one general approach, this processing can comprise, at least in part, only providing current (i.e., during and/or immediately subsequent to the reading step) feedback to an end user regarding the readings of the RFID tags as correlate to the identifier for the targeted module of items. Such feedback might comprise, for example, an incrementing count regarding the number of items for which an RFID tag has been read or a decrementing count that depicts a difference between the number of expected tags and the number of presently-read tags (for example, if it is known a priori that the module of items has a total of 23 items, and so far only 19 of these expected items have been read, the number "4" could be displayed). As another example, in lieu of the foregoing or in combination therewith, such feedback might comprise indicating to the end user that the reading activity for items belonging to the targeted module of items is concluded. The latter might be calculated, for example, by noting that a current count of responding RFID tags matches an anticipated count for that particular module of items (coupled, perhaps, with the observation that no further RFID tags for that particular module of items have responded within some predetermined period of time, such as five seconds).

As another example, this processing can comprise identifying one or more items that were expected to be found with the module of items being read but which were not read. This could be a simple general indicator (such as an illuminated light to indicate to an end user this condition) or it could comprise more complete, elaborate, and/or specific information (such as textual information that describes the missing item(s)). Knowing this, the end user could, if desired, take appropriate follow-on action. This might comprise, for example, rescanning the module of items, manually rearranging or manipulating some of the items in the module of items to possibly make it easier for the reader to read the tag of the missing item(s), and so forth.

Figure 4:
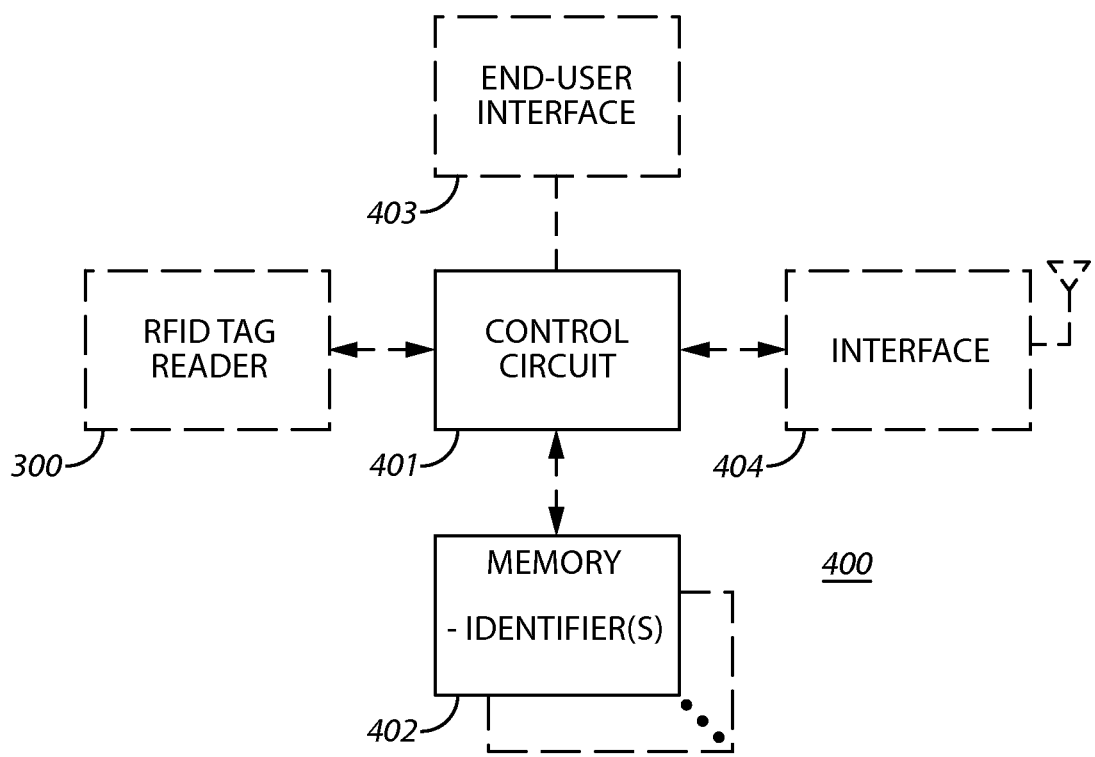
FIG. 4 comprises a block diagram view as configured in accordance with various embodiments of the invention.

The above-described processes are readily enabled using any of a wide variety of available and/or readily configured platforms, including partially or wholly programmable platforms as are known in the art or dedicated purpose platforms as may be desired for some applications. Referring now to FIG. 4, an illustrative approach to such a platform 400 will now be provided.

By one approach, this platform 400 comprises a portable (and possibly, though not necessarily, a hand-held) apparatus. By another approach, this platform 400 comprises a non-portable platform such as a desktop computer, a rack-mounted computer, or the like. These teachings will also accommodate combining one or more portable platforms with one or more non-portable platforms, as desired.

In any event, this platform 400 comprises a control circuit 401 that operably couples to a memory 402 having the aforementioned identifier stored therein as corresponds to a given one of a plurality of modules of items where at least a plurality of these items each has an RFID tag. Such a control circuit 401 can comprise a fixed-purpose hard-wired platform or can comprise a partially or wholly programmable platform. These architectural options are well known and understood in the art and require no further description here.

The control circuit 401 is configured (using, for example, corresponding programming when the control circuit 401 comprises a platform that is at least partially programmable) to carry out one or more of the steps, actions, and/or functions described herein. This can comprise, for example, using the control circuit 401 to access a given module's identifier and to use that identifier to filter RFID tag readings.

This platform 400 can further optionally include one or more end-user interfaces 403. By one approach this can comprise at least a keypad, touchscreen, or other data entry mechanism. So configured, the end user can themselves physically enter the module's identifier when utilizing that identifier-acquisition modality. This end-user interface 403 can of course comprise any of a variety of available mechanisms as desired, including but not limited to active displays, signal lights, haptic mechanisms, and so forth as well as any buttons, switches, triggers, cursor-control mechanisms, or other end-user input devices.

This platform 400 can also optionally include one or more interfaces 404 of choice. By one approach, for example, this can comprise an optical-code reader to facilitate reading module identifiers comprising optical codes. As another example this can comprise a wireless interface of choice to thereby permit, for example, a hand-held platform being used by an end user to wirelessly communicate with, for example, a remote server. Such an approach can serve, for example, to permit the hand-held platform to present a module identifier that the remote server then utilizes to retrieve corresponding SKU numbers for that particular module of items. Such a remote server can then provide those SKU numbers to the hand-held platform via that same wireless link. These teachings will support any of a variety of other interfaces as well, as desired.

As yet another possibility, this platform 400 can optionally comprise an RFID tag reader 300 to thereby facilitate reading RFID tags as described herein. Such an architectural approach can be appropriate, for example, when the platform 400 comprises a portable device that an end user carries with them and utilizes to conduct an inventory of, for example, a retail store display and sales area. The particular RFID tag reader utilized will of course vary to match the type of RFID tag technology being employed at a given application setting.

Such a platform 400 may be comprised of a plurality of physically distinct elements as is suggested by the illustration shown in FIG. 4. It is also possible, however, to view this illustration as comprising a logical view, in which case one or more of these elements can be enabled and realized via a shared platform. It will also be understood that such a shared platform may comprise a wholly or at least partially programmable platform as are known in the art.

So configured, RFID tag reading can readily serve to facilitate a module-by-module inventory in a manner that tends to preserve a module-based view of the items being inventoried. These same teachings will also serve, if desired, to initially correlate one or more RFID tags (and hence their respective items) with a specific module's identifier. This might comprise, for example, placing the items in or on the module's support platform and then reading those RFID tags and associating them (or only selected parts of that information, if desired) with that module's identifier and storing that information for later recall and use.

These teachings are readily applied in conjunction with essentially any RFID methodology or technology. Accordingly, these teachings are highly suited to leverage the functionality and value of numerous already-fielded systems. These teachings are also readily scalable and can be applied successfully in a wide variety of application settings.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for use with modules of items comprising physically discrete displays of the items in a retail display area, where at least a plurality of the items each have a radio frequency identification (RFID) tag, the method comprising:

at a control circuit that is remotely located from but operably coupled to a handheld portable RFID-tag reader:

accessing an RFID identifier that is mounted to a given one of the modules of items, which RFID identifier uniquely identifies the given one of the modules of items and wherein the RFID identifier is technologically different from the RFID tags that correspond to the items and uses a signaling scheme that is different from the RFID tags that correspond to the items;

receiving RFID tag information from the handheld portable RFID-tag reader, both for items that correspond to the given one of the modules of items as well as for items that do not correspond to the given one of the modules of items to provide received RFID tag information;

using the RFID identifier to identify a plurality of stock-keeping unit (SKU) numbers that are correlated with the optical code identifier;

using the plurality of SKU numbers as filter criteria to filter the received RFID tag information by discarding any of the received RFID tag information for the items that do not correspond to a SKU number that is correlated with the given one of the modules of items and thereby retain any of the RFID tag information for items that correspond to the given one of the modules of items to thereby provide filtered RFID tag information;

only providing feedback to an end user regarding readings of RFID tags that are a part of the filtered RFID tag information, and hence that correlate to the given one of the modules of items, wherein the feedback comprises at least one of:

a count of read RFID tags;

an indication to the end user that reading of the RFID tags is concluded.

2. The method of claim 1 wherein the plurality of SKU numbers that are correlated with the identifier constitute three SKU numbers.

3. The method of claim 1 wherein using the RFID identifier to identify a plurality of SKU numbers that are correlated with the RFID identifier comprises using the RFID identifier to access a look-up table to identify the SKU numbers that are correlated with the RFID identifier.

* * * * *